(12) United States Patent
Hofmann et al.

(10) Patent No.: US 10,641,333 B2
(45) Date of Patent: May 5, 2020

(54) CAGE SEGMENT FOR A ROLLING-ELEMENT BEARING CAGE

(71) Applicant: Aktiebolaget SKF, Gothenburg (SE)

(72) Inventors: Sabine Hofmann, Würzburg (DE); Baozhu Liang, Dittelbrunn-Hambach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/214,244

(22) Filed: Dec. 10, 2018

(65) Prior Publication Data

US 2019/0203772 A1 Jul. 4, 2019

(30) Foreign Application Priority Data

Dec. 14, 2017 (DE) .................. 10 2017 222 783

(51) Int. Cl.
*F16C 19/36* (2006.01)
*F16C 33/46* (2006.01)
*F16C 33/50* (2006.01)

(52) U.S. Cl.
CPC .......... *F16C 33/506* (2013.01); *F16C 19/361* (2013.01); *F16C 33/4664* (2013.01);
(Continued)

(58) Field of Classification Search
CPC ...... F16C 19/34; F16C 19/361; F16C 19/386; F16C 19/522; F16C 33/502; F16C 33/366; F16C 33/4664; F16C 33/4676; F16C 41/00; F16C 41/002; F16C 19/184; F16C 2226/60; F16C 2233/00; F16C 2240/12; F16C 2360/31; F16C 33/506;
(Continued)

(56) References Cited

U.S. PATENT DOCUMENTS 4,541,744 A * 9/1985 Lederman ............ B60G 15/068
384/607
5,660,485 A * 8/1997 Podhajecki ............. F16C 19/26
384/572

(Continued)

FOREIGN PATENT DOCUMENTS

DE 102008027082 A1 * 12/2009 ............ F16C 33/508
DE 102012223317 A1 * 6/2014 .......... F16C 33/4611
(Continued)

*Primary Examiner* — Marcus Charles
(74) *Attorney, Agent, or Firm* — Garcia-Zamor Intellectual Property Law, LLC; Ruy Garcia-Zamor; Bryan Peckjian

(57) ABSTRACT

A cage segment for a rolling-element bearing cage includes first and second side elements connected by a bridge extending in a longitudinal direction. A first attaching element on the first side element extends away from the bridge in a first direction parallel to the longitudinal axis and a second attaching element on the second side element extends away from the bridge in a second direction parallel to the longitudinal axis. The first and second attaching elements are configured to receive a wire or cable for connecting the cage segments to other cage segments, and the first attaching element is offset from the longitudinal axis in a first direction by a first distance and the second attaching element is offset from the longitudinal axis in a second direction opposite the first direction by a second distance.

11 Claims, 2 Drawing Sheets

(52) U.S. Cl.
CPC ........ *F16C 33/4676* (2013.01); *F16C 33/508* (2013.01); *F16C 2226/60* (2013.01)

(58) Field of Classification Search
CPC ..... F16C 33/508; G01B 21/32; G01L 5/0019; G01L 5/0028; G01M 5/0041
USPC ........ 384/548, 551, 559, 577, 562, 572–574
See application file for complete search history.

(56) References Cited

U.S. PATENT DOCUMENTS

| | | | | |
|---|---|---|---|---|
| 8,523,451 | B2 * | 9/2013 | Ozu | F16C 19/26 |
| | | | | 384/551 |
| 8,926,190 | B2 * | 1/2015 | Fox | F16C 33/4611 |
| | | | | 384/573 |
| 9,039,289 | B2 * | 5/2015 | Fox | F16C 43/04 |
| | | | | 384/573 |
| 9,097,283 | B2 * | 8/2015 | Werner | F16C 33/4611 |
| 9,217,470 | B2 * | 12/2015 | Beck | F16C 43/04 |
| 2016/0273585 | A1 * | 9/2016 | Perrotin | F16C 19/10 |

FOREIGN PATENT DOCUMENTS

| | | | | |
|---|---|---|---|---|
| DE | 102013224541 A1 * | 6/2015 | | F16C 33/50 |
| DE | 102014205912 A1 * | 10/2015 | | F16C 33/51 |
| DE | 102014207836 B4 * | 2/2016 | | F16C 33/4605 |
| DE | 102017101034 A1 * | 7/2018 | | F16C 33/50 |
| GB | 825689 A * | 12/1959 | | F16C 33/4611 |

\* cited by examiner

CAGE SEGMENT FOR A ROLLING-ELEMENT BEARING CAGE

CROSS-REFERENCE

This application claims priority to German patent application no. 10 2017 222 783.4 filed on Dec. 14, 2017, the contents of which are fully incorporated herein by reference.

TECHNOLOGICAL FIELD

The present disclosure relates to a cage segment for a rolling-element bearing cage that includes a first side element and a second side element that are connected by a bridge.

BACKGROUND

Cages for rolling-element bearings that are formed of individual cage segments are known. These cage segments have connecting elements to which a wire, a cable or a ring can be attached to hold the cage segments together. These connecting elements are provided on the cage segments, and the cable, wire, or ring is pulled through these connecting elements to connect the cage segments and form a cage. This cage assembly can be mounted on a rolling-element bearing ring and, the wire, cable or ring prevents the cage from falling apart.

In the operation of the bearing there are mostly loaded zones (loaded regions) and unloaded zones (non-loaded regions). Unloaded zones mean for the rolling-element elements and cage segments that their movement obtains a certain degree of freedom, and the rolling elements and cage segments are less guided. This undefined and involuntary movement of the rolling elements and of the cage segments can cause an additional load on the cage segment elements and other bearing parts, which leads to a negative influence on the individual parts of the bearing. This negative influence can in turn lead to a reduced service life of the bearing due to fatigue of the parts of the bearing.

SUMMARY

It is therefore an aspect of the present disclosure to provide a cage segment that is subject to a reduced load when assembled into a bearing cage.

The disclosed cage segment includes a first side element and a second side element that are connected by a bridge. A first attaching element is disposed on the first side element and a second attaching element is disposed on the second side element. Using a coupling means, such as a wire, cable or ring, the cage segment is connectable to a further cage segment via the first and the second attaching element.

In order to reduce the load on the cage segments, according to the disclosure, a cage segment it is configured such that the connecting elements on the sides of the cage segments are no longer to be aligned along an axis, but rather the attaching elements are to be disposed laterally offset with respect to each other relative to a longitudinal axis of the side bridge.

Viewed over the entire cage, this has the advantage that when the cage segments are located in an unfavorable position on the bearing circumference in the non-loaded region, due to a generated self-locking they cannot easily move spontaneously. Here the offset of the attaching elements with respect to each other acts against a spontaneous movement due to the resulting friction.

The cage segments can be additionally guided by the coupling means, whereby the cage assembly benefits from stability. The cage segments can be guided in the non-loaded region by the coupling means, which can be, for example, a cable, wire, or a ring and has a defined preload. An undefined and involuntary movement of the cage segments and the load associated therewith is thereby reduced.

Alternatively or additionally a defined end play or clearance can be provided in the assembled cage assembly between cage segments and rolling elements in the circumferential direction, which also counteracts an additional load.

According to one embodiment the first and the second attaching elements are configured as eyelets through which the coupling element can be threaded.

When eyelets are used as the attaching elements, the coupling element can be guided through these eyelets in a simple manner and removed again if required. Here the coupling element is not fixedly attached in the eyelets, but rather can move. Play between the cage segments and movement of the cage segments with respect to one another are thereby not restricted. Alternatively the eyelets can also be configured as open hooks.

In a further embodiment the distance between the first attaching element and the bridge and the second attaching element and the bridge is the same.

Due to the symmetrical design of the cage segment, the cage segment can be used in a simple manner and in any direction. Thus only a single type of cage segment must be manufactured. The manufacturing costs can thereby be reduced, and the cage segment can be used variably.

Another aspect of the disclosure comprises a rolling-element bearing cage formed from a plurality of cage segments held together by a wire or a cable. Each of the cage segments includes a first side element connected to a second side element by a bridge that extends along a longitudinal axis. A first hook or eyelet on the first side element extends away from the bridge in a first direction parallel to the longitudinal axis, and a second hook or eyelet on the second side element extends away from the bridge in a second direction parallel to the longitudinal axis. The first hook or eyelet is offset from the longitudinal axis in a first direction by a first distance, and the second hook or eyelet is offset from the longitudinal axis in a second direction opposite the first direction by a second distance. The wire or cable is retained by the first and second hooks or eyelets of each of the plurality of cage segments to hold the cage segments together to form a bearing cage.

A further aspect of the disclosure is a rolling-element bearing cage that includes a plurality of cage segments as are described above. Here the plurality of cage segments is connectable at least temporarily via a coupling element by the coupling element being brought into engagement with the attaching elements.

According to one embodiment the spacing between each pair circumferentially adjacent attaching elements is the same over the circumference of the rolling-element bearing cage.

According to this embodiment the attaching elements are evenly circumferentially spaced around over the circumference of the rolling-element bearing cage. The cage segments can therefore be configured symmetrically and the same cage segments can be used around the circumference of the rolling-element bearing cage. The manufacturing costs can thereby be reduced since only one type of cage segment must be manufactured.

Alternatively the distance between pairs of circumferentially adjacent attaching elements can vary over the circumference of the rolling-element bearing cage.

According to this embodiment the spacing between two adjacent connecting elements over the circumference of the rolling-element bearing cage is not the same. This results in a greater spacing between two adjacent attaching elements, whereby more space is present in order to guide through the coupling means. This is advantageous in particular if the coupling element includes two ends that are connected to each other via a connecting means.

Here the connecting means can be configured as a screw element that includes two threaded sections spaced apart in the circumferential direction. Here each threaded section interacts with a screw section that is disposed on each of the two ends of the coupling element. Due to the greater spacing between two attaching elements this screw element can be actuated simply.

The coupling element can be a component that transmits a tensile force but is largely flexible, such as a cable.

In a further aspect, a rolling-element bearing includes at least one inner ring and at least one outer ring and rolling elements disposed between the inner ring and the outer ring. The rolling elements are held by a rolling-element bearing cage as described above.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
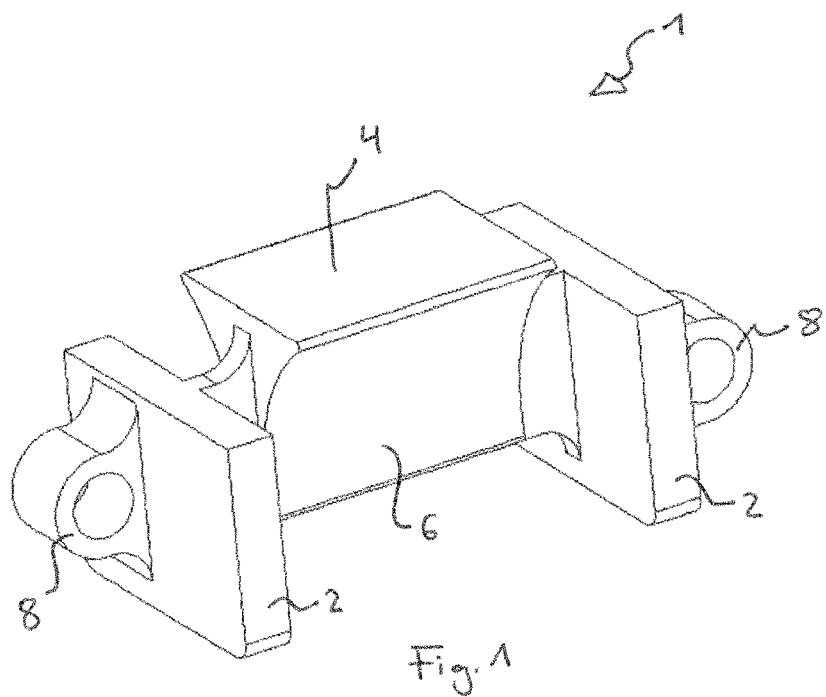
FIG. 1 is a perspective view of a cage segment according to the present disclosure.

FIG. 1 shows a cage segment 1 that can be used in a rolling-element bearing.

The cage segment 1 includes two attaching elements 2 that are connected to each other via a bridge 4. The bridge 4 includes two guide surfaces 6 on which the rolling elements 10 abut in the assembled rolling-element bearing. Here the guide surfaces 6 can be identically curved on both sides of the bridge 4. In particular the curvature of the guide surfaces 6 is concave and the curvature of the rolling elements 10 is matched.

In order to connect the individual cage segments to one another, a first and a second attaching element 8 are respectively disposed on the first and second side element 2. The attaching elements 8 can be configured as eyelets or hooks (not shown).

A coupling element (not shown) can be guided-through through these eyelets 8 in a simple manner and removed again if required. The coupling elements can be, for example, a cable or a wire. Here the coupling element is not fixedly connected to the eyelets 8 but can move in them. Play between the cage segments 1 and movement of the cage segments 1 with respect to one another are thereby not restricted.

In order to reduce movement of the rolling elements and cage segments 1 in unloaded zones, the first and the second attaching element 8 are disposed laterally offset with respect to one another with respect to a longitudinal axis A of the side bridge 4. This is shown in particular in FIGS. 2 to 4.

Figure 2:
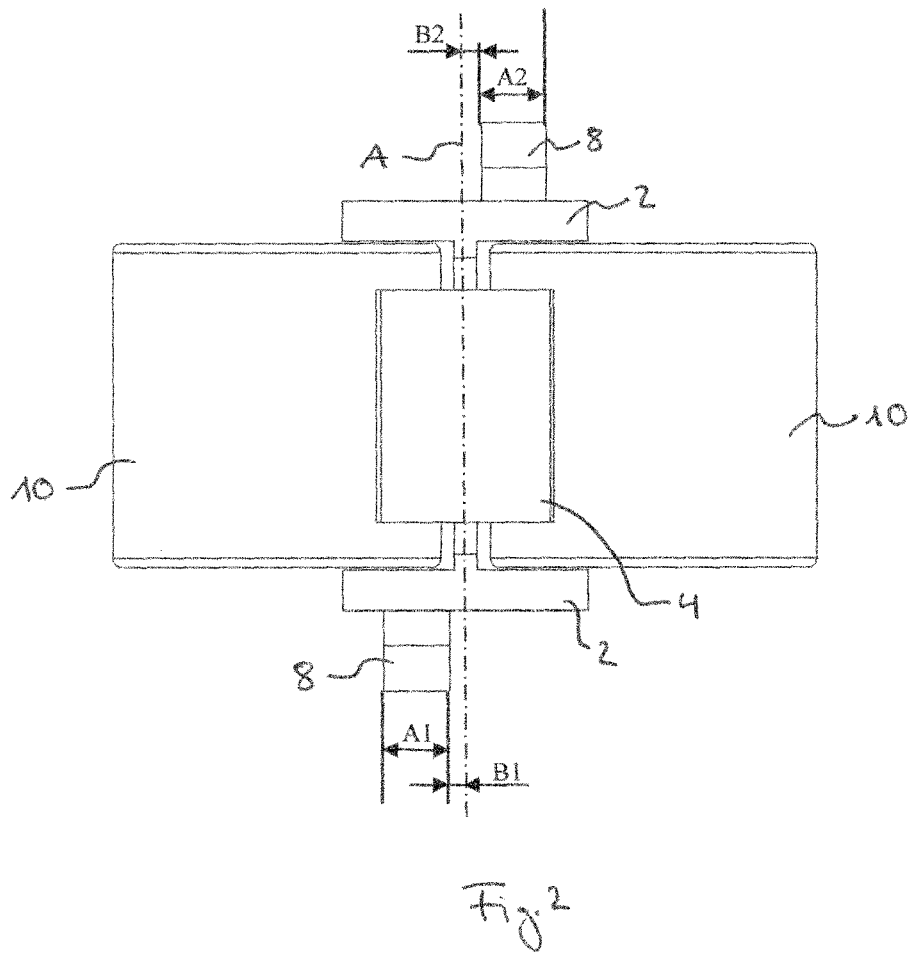
FIG. 2 is a plan view of the cage segment of FIG. 1 and rolling elements.

As shown in FIG. 2, the spacing between the axis A and each of the attaching elements 8 is the same. For example, on one side of the cage segment 1 the spacing B1 of the attaching element 8 to the axis A is equal to one-tenth of the width A1 of the attaching element 8. In an analogous manner thereto, on the opposite side of the cage segment 1 the spacing B2 of the attaching element 8 to the axis A is equal to one-tenth of the width A2 of the attaching element 8.

Figure 3:
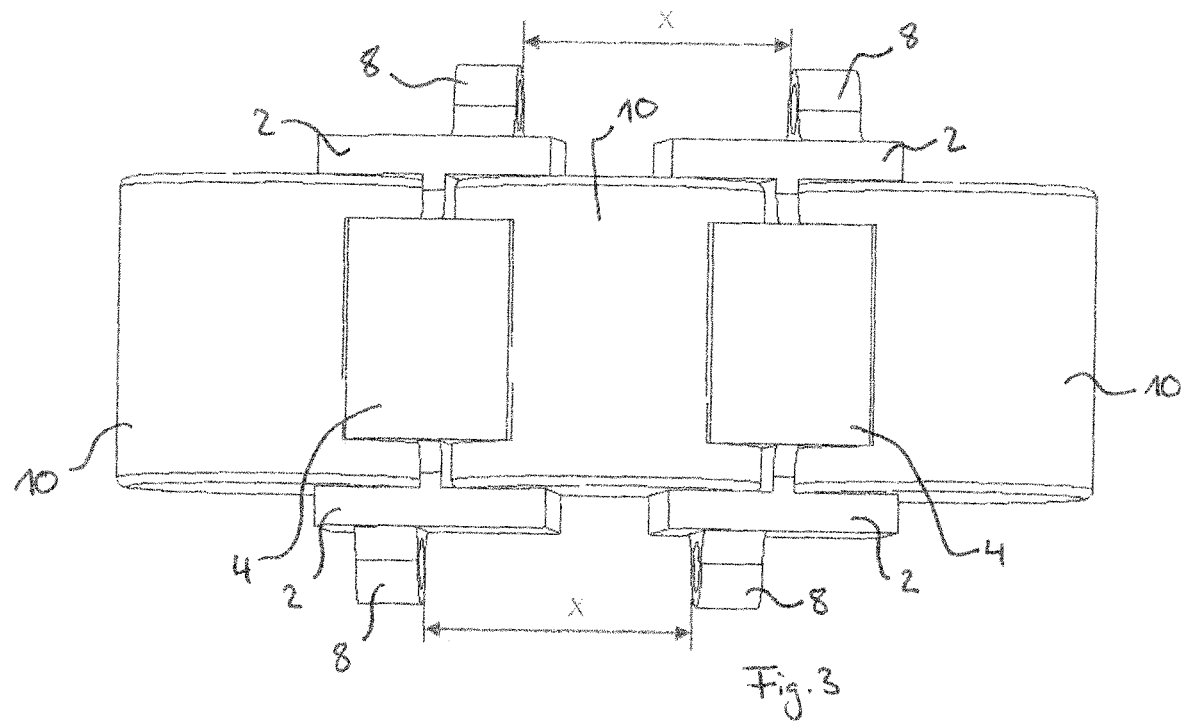
FIG. 3 is a plan view of two adjacently disposed cage segments according to the present disclosure and rolling elements therebetween.

In one embodiment as shown in FIG. 3, the spacing X in the assembled rolling-element bearing between two circumferentially adjacent attaching elements 8 is the same over the circumference of the rolling-element bearing.

Figure 4:
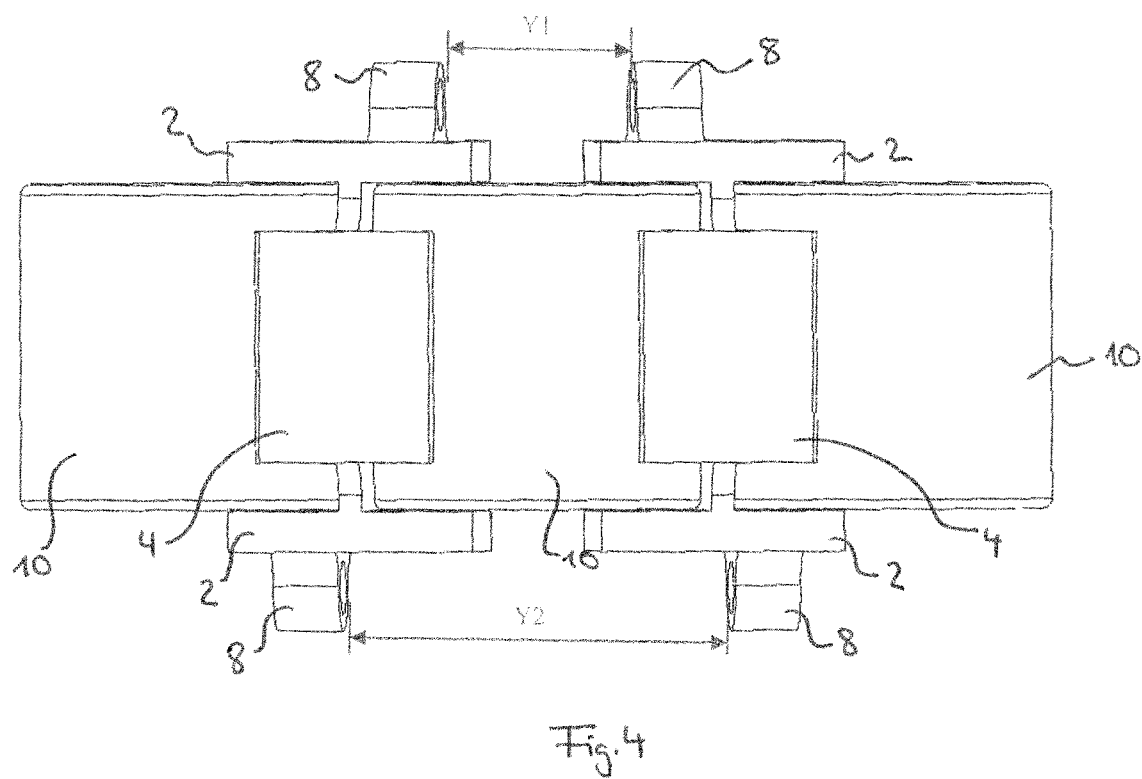
FIG. 4 is a plan view of an alternate arrangement of two cage segments according to the present disclosure disposed adjacent to each other and including rolling elements.

Alternatively the cage segments 1 can be disposed in an opposite manner, whereby two adjacent attaching elements 8 have a spacing Y1 on one side, and opposite two attaching elements 8 have a spacing of Y2. This is shown in FIG. 4. Here the spacings Y1 and Y2 are different from each other. Due to the larger spacing Y2 between two adjacent attaching elements 8, more space is provided to guide-through the coupling element. In particular a connecting means for closing the coupling element can be disposed in this larger spacing Y2. The spacings Y1 and Y2 can alternate on one side over the circumference of the rolling-element bearing.

It is also possible to provide the spacings Y1 and Y2 only once and provide an identical spacing X between the cage segments over the remaining circumference. In this case a connecting means for closing the coupling element can also be disposed in the larger spacing Y2.

Using the disclosed cage segment an involuntary movement of the individual cage segments in unloaded zones of the rolling-element bearing can be reduced in a simple manner. Furthermore, sufficient space for disposing a connector for closing a coupling element can be provided by a design having different, varying spacings between the attaching elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved cage segments for roller bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Cage segment
2 Side element
4 Bridge
6 Guide surface
8 Attaching element
10 Rolling element
A Axis
A1, A2 Width of the attaching element
B1, B2 Spacing between attaching element and axis
X Spacing between two attaching elements
Y1, Y2 Spacing between two attaching elements

What is claimed is:

1. A cage segment for a rolling-element bearing cage, the cage segment comprising:
a first side element connected to a second side element by a bridge, the bridge extending along a longitudinal axis, an axial direction being defined perpendicular to the longitudinal axis, the cage segment not defining an enclosed pocket therein,
a first attaching element on the first side element extending away from the bridge in a first direction parallel to the longitudinal axis, the first attaching element having a first width and comprising a cylindrical eyelet,
a second attaching element, identical to the first attaching element, on the second side element extending away from the bridge in a second direction parallel to the longitudinal axis, the second attaching element having a second width and comprising the cylindrical eyelet,
the first and second attaching elements being configured to receive a coupling means for connecting the first cage segment to a second cage segment and a third cage segment,
wherein the first attaching element is offset from the longitudinal axis in a first direction by a first distance to form a first spacing between the first attaching element and the longitudinal axis and the second attaching element is offset from the longitudinal axis in a second direction opposite the first direction by a second distance to form a second spacing between the second attaching element and the longitudinal axis, wherein the first distance is equal to the second distance, wherein the sum of the first width and the second width is less than an axial width of the first side element.

2. A rolling-element bearing cage comprising the cage segment of claim 1, a second cage segment, identical to the cage segment, and a third cage segment, identical to the cage segment, wherein the cage segment, the second cage segment, and the third cage segment are connected by the coupling means running through the first attaching element and the second attaching element of each of the cage segment, the second cage segment, and the third cage segment.

3. The rolling-element bearing cage according to claim 2, wherein the first, second and third cage segments are substantially identical and wherein each adjacent pair of the attaching elements are separated by a first circumferential distance.

4. The rolling-element bearing cage according to claim 2, wherein the second and third cage segments each having a first attaching element on a first side element and a second attaching element on a second side element, the first and second attaching elements of the second and third cage segments being offset in opposite directions from a respective longitudinal axis of the respective bridges of the second and third cage segments,
wherein the first attaching element of the first cage segment is circumferentially spaced from the first attaching element of the second cage segment by a first distance and the second attaching element of the first cage segment is circumferentially spaced from the second attaching element of the second cage segment by a second distance greater than the first distance.

5. The rolling-element bearing cage according to claim 2, wherein the coupling means has a first end and a second end connected to each other by a connector.

6. The rolling-element bearing cage according to claim 5, wherein the connector comprises a screw element having two threaded sections spaced apart in the circumferential direction, wherein each threaded section interacts with a screw section that is disposed on each of the two ends of the coupling element.

7. The rolling-element bearing cage according to claim 2 wherein the coupling means comprises a wire or a cable.

8. A rolling-element bearing including:
an inner ring,
an outer ring;
a plurality of rolling elements disposed between the inner ring and the outer ring, and
the rolling-element bearing cage according to claim 2.

9. A rolling-element bearing cage comprising a plurality of cage segments held together by a wire or a cable,
each of the cage segments comprising:
a first side element connected to a second side element by a bridge, the bridge extending along a longitudinal axis, an axial direction being defined perpendicular to the longitudinal axis, the cage segment not defining an enclosed pocket therein,
a first attaching element on the first side element extending away from the bridge in a first direction parallel to the longitudinal axis, the first attaching element having a first width and comprising a cylindrical eyelet,
and a second attaching element, identical to the first attaching element, on the second side element extending away from the bridge in a second direction parallel to the longitudinal axis, the second attaching element having a second width and comprising the cylindrical eyelet,
the first attaching element being offset from the longitudinal axis in a first direction by a first distance to form a first spacing between the first attaching element and the longitudinal axis and the second attaching element being offset from the longitudinal axis in a second direction opposite the first direction by a second distance to form a second spacing between the second attaching element and the longitudinal axis, wherein the first distance is equal to the second distance, wherein the sum of the first width and the second width is less than an axial width of the first side element, wherein the wire or cable is retained by the first and second attaching elements of each of the plurality of cage segments.

10. The rolling-element bearing cage according to claim 9, wherein the plurality of cage segments include a first cage segment circumferentially adjacent to a second cage segment, and wherein the first attaching element of the first cage segment is circumferentially spaced from the first attaching element of the second cage segment by a first distance and the second attaching element of the first cage segment is circumferentially spaced from the second attaching element of the second cage segment by a second distance equal to the first distance.

11. The rolling-element bearing cage according to claim 9, wherein the plurality of cage segments include a first cage segment circumferentially adjacent to a second cage segment, and wherein the first attaching element of the first cage segment is circumferentially spaced from the first attaching element of the second cage segment by a first distance and the second attaching element of the first cage segment is circumferentially spaced from the second attaching element of the second cage segment by a second distance greater than the first distance.

\* \* \* \* \*